United States Patent
Swarthout

[11] 3,745,685
[45] July 17, 1973

[54] SELF-RIGHTING FISH LURE
[76] Inventor: Gerald M. Swarthout, 620 Darwin, Pinckney, Mich. 48169
[22] Filed: Aug. 16, 1971
[21] Appl. No.: 172,151

[52] U.S. Cl............................ 43/42.34, 43/42.35
[51] Int. Cl........................................... A01k 85/00
[58] Field of Search................... 43/42.34, 42.33, 43/42.35, 42.32, 42.48

[56] References Cited
UNITED STATES PATENTS

| | | | |
|---|---|---|---|
| D159,402 | 7/1950 | Algier | 43/42.48 UX |
| 1,639,863 | 8/1927 | Sinclair et al. | 43/42.32 UX |
| 2,493,487 | 1/1950 | Grimm | 43/42.48 |
| 2,938,293 | 5/1960 | Richardson | 43/42.32 X |
| 2,641,862 | 6/1953 | Poe | 43/42.35 X |
| 2,270,488 | 1/1942 | Withey | 43/42.35 |
| 2,781,604 | 2/1957 | Brown | 43/42.35 X |
| 2,995,857 | 8/1961 | Arff | 43/42.34 |
| 2,694,877 | 11/1954 | Wise | 43/42.33 |
| 2,665,515 | 1/1954 | Frantello | 43/42.33 |

Primary Examiner—Louis G. Mancene
Assistant Examiner—Daniel J. Leach
Attorney—Russel C. Wells

[57] ABSTRACT

A fish lure having a longitudinal downwardly concave bottom surface and a convex upper surface that is high in the central portion and converges at either end of the lure toward the bottom surface. A trough extends along the longitudinal center line of lure from the front edge to the central portion of lure providing a waterway over the lure. Large eyes function to control the erratic but non-violent darting action of the lure in the water. Two sets of hooks are secured to the lure wherein the forward hooks have a longer shank than the rearward hooks.

3 Claims, 7 Drawing Figures

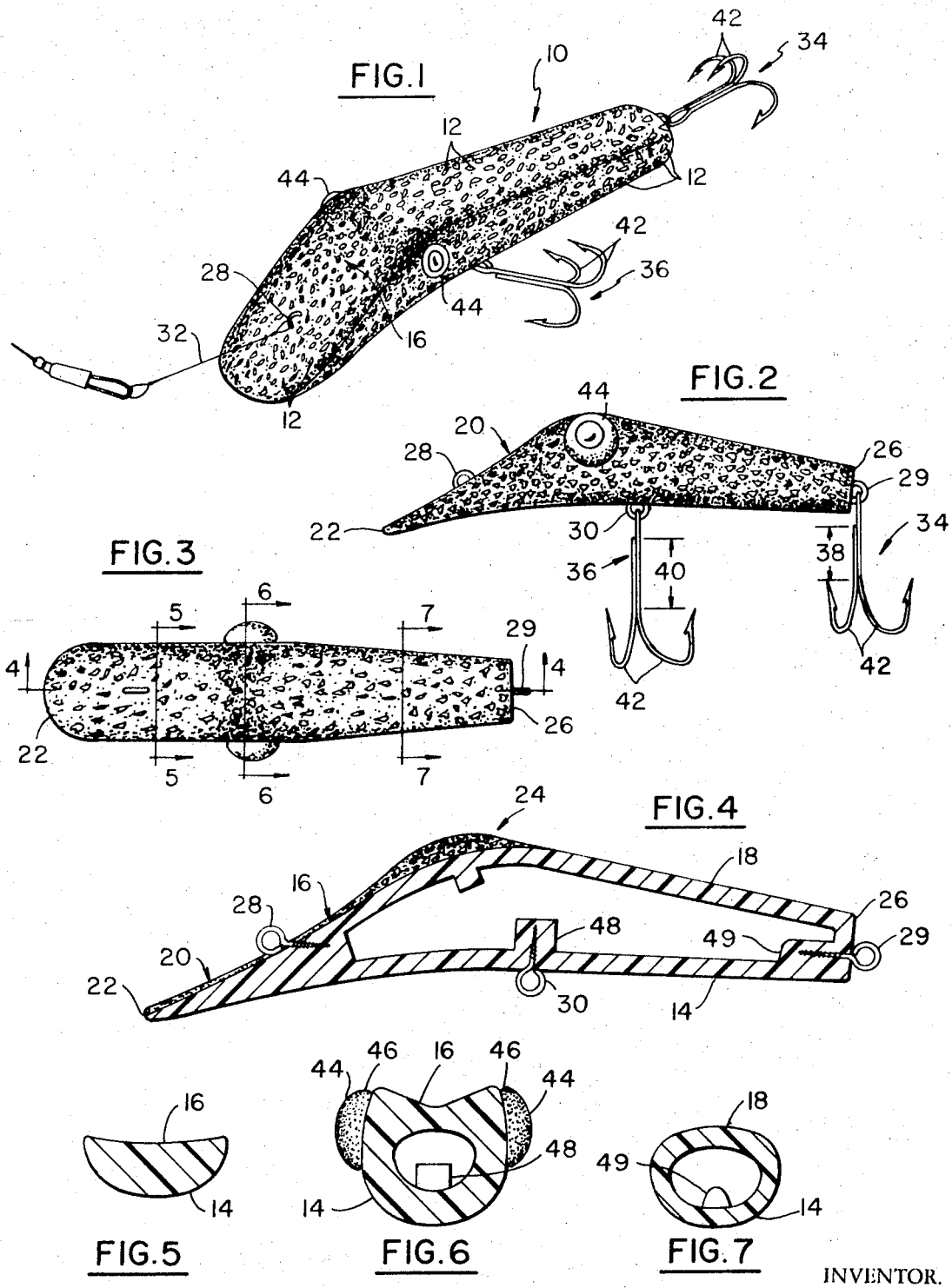

3,745,685

SELF-RIGHTING FISH LURE

FIELD OF INVENTION

This invention relates to fish lures in general and to control surfaces thereon controlling the depth and action of the lure.

PRIOR ART

Prior art fishing lures having hollow bodies, have either an inlet water passage to admit water into the body for causing the lure to sink and at the same time using the pressure of the incoming water to force air out through an outlet passage thereby creating fish attracting air bubbles. Other hollow-body lures have a moveable weight therein which depend upon the speed of lure for causing the lure to move about in the water as the weight relocates with the body. Still other hollow-body lures use the inner surface of the lure to construct the lure design thereon. However, none of the aforementioned hollow-body lures teach or suggest a self-righting lure.

It is therefore a principal object of this lure to attract and catch fish by providing a fish-like appearance and action.

It is another object of this lure to provide a lure capable of turning over wherever the fisherman is moving the lure through an undesirable location.

It is another object of this lure to self-right itself in the water whenever the lure is moving through the water.

SUMMARY OF INVENTION

A self-righting fish lure is disclosed having a body portion with an increasing tapered bill from the front edge toward the central portion of the body and decreasing tapered tail portion extending from the central portion toward the rear edge of lure. A centrally extending trough of uniformaly varying depth extends from the front edge of the bill beyond the central portion of the lure to a blending surface on the tail portion of the lure. On either side of the lure and in the central portion thereof are a pair of large eyes which are positioned so as to have the bottom of the trough below the upper surface of the eyes. One hook member is attached to the rear surface of the lure and a second hook member is attached to the longitudinally downwardly convex bottom surface of the lure rearward of the eyes. A leader-attaching eye is positioned on the bill portion of the lure and along the longitudinal center line thereof cooperating with the placement and size of the eyes, the trough and the two hooking members to control the action of the lure within the water.

DESCRIPTION OF DRAWINGS

FIG. 1 is a perspective view of the fish lure of the present invention;

FIG. 2 is a elevation view of the fish lure of FIG. 1;

FIG. 3 is a top view of the fish lure of FIG. 1;

FIG. 4 is a longitudinal sectional view taken along line 4—4 of FIG. 3 illustrating the contour of the trough portion of said lure;

FIG. 5 is a transverse sectional view taken along line 5—5 of FIG. 3 illustrating the trough portion of the bill;

FIG. 6 is a transverse sectional line taken along line 6—6 of FIG. 3 showing the trough portion and the relationship of the eyes thereto; and FIG. 7 is a transverse sectional view taken along line 7—7 of FIG. 3 illustrating the hollow portion of the tail of the fish lure of FIG. 1.

DETAILED DESCRIPTION

Referring to the FIGS. by the characters of reference, there is illustrated in FIG. 1 a perspective view of the fish lure 10 according to the present invention. The body of the lure in the preferred embodiment is molded or fabricated from a transparent plastic material. Secured about the external surface of the lure are a plurality of spaced apart scale-like members 12 such as tinsel of either a gold or silver color. The external surface of the scale-like members are randomly inclined toward the surface of the body of the lure. The color of the tinsel depends on the desired appearance of the lure.

The body of the lure 10 is basically an elongated, oblong lure having a length substantially greater than the width. FIG. 4 is a sectional view of lure taken along the longitudinal center line of lure and serves to illustrate the symmetry of the lure 10 about that center line. As illustrated in FIGS. 5–7, the lower or bottom surface 14 of the lure is not flat but has a curved or convex surface. The upper surface of the lure has a varying profile from a shallow trough 16 at the front or left end of lure in FIG. 2 to a deeper trough in the central portion of the lure as illustrated in FIG. 6 and then the upper surface blends into the somewhat rounded upper surface 18 of the tail section.

As illustrated in FIG. 4, the front or bill 20 or planing surface of the lure 10 is a concave surface forming a trough 16 which extends from the front edge 22 of the lure to and over the crowned central portion 24 of the lure. The trough extends to the beginning of the tail section where it is blended into the upper rounded surface thereof.

The bottom surface 14 of the lure in addition to being convex in the transverse direction, takes a generally downwardly concave appearance along the longitudinal center line. The front edge 22 of the bill 20 and the bottom surface 14 substantially meet along a common line as far as is practical from a manufacturing standpoint. The front edge is not a knife edge inasmuch as the trough 16 is defined along that edge. The rear or tail edge 26 is a substantial surface formed by the abrupt discontinuity of the upper tail surface 18 which was converging toward the bottom surface 14.

The interior of the lure 10 is hollow in the central portion 24 and the tail section but is solid in the bill 20 section. This gives the tail section a tubular cross-section wherein the tail edge 26 is closed. The cross-section area of the walls of the tail section, in the preferred embodiment are substantially uniform thereby providing a balanced body about the longitudinal center line. The inside surface of the central portion of the tail section may be covered with a transparent colored film to give a clear but colored appearance to the lure.

Along the longitudinal center line of the lure there are positioned three eyes 28, 29 and 30 for securing a line leader 32, and two sets of hooking members 34 and 36. The eye 28 to which the fishing line leader 32 is secured is positioned on the bill surface at a point closer to the front edge 22 than to the central portion 24 of the lure. The first eye 29 for securing a first hooking means 34 is on the rear or tail vertical surface 26 of the lure. The second eye 30 for securing a second hooking means 16 is on the bottom surface 14 at approximately the boundary surface of the central portion and the tail portion of the lure.

The hooking means 34 and 36 attached to each of the two hooking eyes 29 and 30 comprise a shank portion 38 and 40 terminating at an eye at one end and a plurality of angularly spaced hooks 42 at the other end. In the preferred embodiment, there are three hooks at the other end of each shank 38 and 40. The shank portion 40 of the second hooking means 36 attached to the bottom surface eye 30 is longer than the shank portion 38 of the first hooking means 34. This added length changes the weight of the two hooking means and puts the greater weight attached to the bottom surface causing the lure to land right side up when cast into the water. All hooks 42 of both hooking means are identical in size and shape.

Attached to either side of the lure 10 and in the central portion thereof are a pair of eyes 44. Each eye is basically a portion of a sphere and each extends outwardly from the body of the lure. The eyes are detailed in that each contains a pupil and have the appearance of large eyes of a fish. This large fish-eye appearance of the two eyes 44 attracts the fish to the lure since a fish's killing instinct is to strike at the eye of its prey. The eyes are positioned along the side of the lure in such a manner that the bottom of the trough 16 in the central portion 24 of the lure is below the uppermost surface of the eye 46.

Additionally as illustrated in the FIGS., there are two bosses 48 and 49 on the inner surface of the lure to secure the threaded portion of the two hooking eyes 29 and 30.

The trough 16 which extends in the central portion 24 of the lure 10, functions to force the lure to go to greater depths than would otherwise be attainable. In the preferred embodiment, the lure 10 will go to depths of 10 to 15 feet while lures not having this trough need a special nose section generally long and scoop-like attached to the lower part of the lure to go to this depth.

Cooperating with the trough 16 to control the depth of the lure 10 is the placement of leader eye 28 and the speed of the lure through the water. With the eye 28 positioned closer to the front edge 22 of the lure, the speed of the lure will control the depth of the lure. If the lure 10 is pulled at a fast speed, the lure will turn over in a bottom up position and rise to the surface. Conversely, if the lure is pulled at a much slower speed, the lure will seek greater depths. Therefore, if a fisherman desires to avoid a weed bed while trolling or casting, he need only move the lure at a faster speed thereby causing the lure to surface with the bottom side up. Trolling speeds can be controlled by the action of the lure.

The larger eyes 44 not only function as appearance members of the lure for attracting fish but also provide a desired weight in the central portion 24 of the lure 10 and further stabilize the movement of lure through the water. Again in cooperation with the trough 16 as illustrated from the front edge 22 to the tail section, the action of the lure is not of any set or repeatable pattern but will move in darting action from side to side in an erratic but non-violent manner of a fish.

The hollow portion of the lure 10 body provides a buoyant effect to the lure causing the lure to surface at a slow speed or stopped condition. In addition, the balance of the lure due to the position of the eyes 44, the solid bill 20 and the hollow body cooperates to float the lure right side up. In addition, when casting the lure 10 it will always land bottom side down in the water and will not turn over when the lure is moved through the water.

There has thus been shown and described a fishing lure having a trough extending from the front edge thereof over the crown portion of the central portion of the lure toward the tail section. The trough provides a waterway for the passing water as the lure moves relative thereto and additionally cooperates with the large eyes, the position and size of the hooking members and the position of leader eye to control the depth and action of the lure in the water.

What is claimed is:

1. A self-righting fish lure comprising:
   a body portion having an increasingly tapered bill from one end toward a central portion of said body and having a decreasing tapered tail portion abruptly ending at the other end of said body,
   a centrally extending trough extending from the end of said bill toward and beyond the central portion of said body the bottom surface of said trough being an arcuate concave surface in a transverse section of said bill and terminating on said tail portion of said body,
   a pair of eye members positioned on either side of said body at the central portion thereof, said eye members extending outwardly in a spherical manner on either side of said body, said eye members positioned to have a portion thereof extending above the bottom of said trough,
   a pair of long-shank hook members, a first long-shank hook member extending from the abrupt other end portion of said body and a second long-shank hook member extending downwardly from said body forward of said abrupt end portion, said first hook member having a shank length less than the shank length of said second hook member, both of said hook members extending from said body along the vertical plane through the longitudinal axis thereof,
   a leader attachment positioned along the center line of said trough and substantially nearer said one end of said bill then said central portion of said body,
   a plurality of irregular scale-like reflective tinsel members randomly secured to and inclined toward said body, said random positioning providing areas of scale-removed body patches.

2. A self-righting fish lure according to claim 1 wherein the bottom of said body is convex across its width and longitudinally downwardly concave from the end of said bill to approximately said second hook means.

3. A self-righting fish lure according to claim 2 wherein said tail portion extending from said central portion of said body to said abrupt end is tubular with the side walls and the end wall thereof of substantially uniform cross sectional area.

* * * * *